(12) United States Patent
Cordell et al.

(10) Patent No.: US 10,741,179 B2
(45) Date of Patent: Aug. 11, 2020

(54) QUALITY CONTROL CONFIGURATION FOR MACHINE INTERPRETATION SESSIONS

(71) Applicant: Language Line Services, Inc., Monterey, CA (US)

(72) Inventors: Jeffrey Cordell, Carmel, CA (US); Lindsay D'Penha, Carmel, CA (US); Julia Berke, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 263 days.

(21) Appl. No.: 15/913,887

(22) Filed: Mar. 6, 2018

(65) Prior Publication Data
US 2019/0279621 A1   Sep. 12, 2019

(51) Int. Cl.

| | | |
|---|---|---|
| *G10L 15/22* | (2006.01) | |
| *G06N 5/04* | (2006.01) | |
| *G10L 15/26* | (2006.01) | |
| *G10L 15/28* | (2013.01) | |
| *G06F 3/0484* | (2013.01) | |
| *G06F 40/40* | (2020.01) | |

(52) U.S. Cl.
CPC ............ *G10L 15/22* (2013.01); *G06F 3/0484* (2013.01); *G06F 40/40* (2020.01); *G06N 5/04* (2013.01); *G10L 15/26* (2013.01); *G10L 15/28* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 8,145,472 B2* | 3/2012 | Shore | G06F 40/58 704/2 |
| 8,713,037 B2* | 4/2014 | Nikoulina | G06F 40/51 707/760 |
| 10,261,994 B2* | 4/2019 | Marcu | G06Q 10/0639 |
| 10,372,828 B2* | 8/2019 | Miklosch | G06F 40/58 |
| 2008/0235202 A1* | 9/2008 | Wang | G06F 16/3337 |
| 2009/0106017 A1* | 4/2009 | D'Agostini | G06F 40/58 704/3 |
| 2009/0222437 A1* | 9/2009 | Niu | G06F 16/951 |
| 2011/0282647 A1* | 11/2011 | Pastore | G06F 40/47 704/4 |
| 2013/0124185 A1* | 5/2013 | Sarr | G06F 40/58 704/2 |
| 2017/0169015 A1* | 6/2017 | Huang | G06F 40/58 |
| 2018/0261216 A1* | 9/2018 | Leeb | G10L 15/02 |

* cited by examiner

*Primary Examiner* — Neeraj Sharma
(74) *Attorney, Agent, or Firm* — Patent Ingenuity, P.C.; Samuel K. Simpson

(57) ABSTRACT

A configuration provides quality control compliance for a plurality of machine language interpreters. A processor receives a plurality of requests for human-spoken language interpretation from a first human-spoken language to a second human-spoken language. Further, processor routes the plurality of requests to a plurality of machine language interpreters. In addition, an artificial intelligence system associated the plurality of machine language interpreters determines one or more quality control criteria. The processor also monitors compliance of the one or more quality control criteria by the plurality of machine language interpreters during simultaneously occurring machine language interpretations performed by the machine language interpreters.

17 Claims, 6 Drawing Sheets

QUALITY CONTROL CONFIGURATION FOR MACHINE INTERPRETATION SESSIONS

BACKGROUND

1. Field

This disclosure generally relates to the field of language interpretation. More particularly, the disclosure relates to machine language interpretation from a first human-spoken language to a second human-spoken language.

2. General Background

Conventional configurations typically allow a human language interpreter to perform language interpretation of a first human-spoken language, spoken by a first human user, to a second human-spoken language, spoken by a second human user, and vice-versa. For example, the first human user may speak a first human-spoken language (i.e., a language that is traditionally spoken by a group of people originating from a particular geographical location, country, or region) such as English; a second human user may speak a second human-spoken language such as Spanish. A telecommunications network may be utilized to establish an over-the-phone interpretation ("OPI") session between the human language interpreter and the human users. In other words, the human language interpreter may be remotely located from the users, but the human language interpreter may still provide human language interpretation services, via telephone, to the users.

Conventional OPI configurations provide users with the convenience of obtaining human language interpretation at a desired location rather than having to travel to a physical location where the human language interpreter is present for an in-person language interpretation session; however, such configurations are limited by certain constraints. For example, a human language interpreter may not be available at the time of the users' request for language interpretation. Further, contextual information, specific skill sets, etc. pertinent to the particular users requesting the OPI session may not be retained, or even known, to the current human language interpreter since the available human language interpreter is often different than the human language interpreter that participated in previous OPI sessions for the users. Therefore, human-based OPI configurations often have limited efficacy.

SUMMARY

A configuration provides quality control ("QC") compliance for a plurality of machine language interpreters ("MLIs"). A processor receives a plurality of requests for human-spoken language interpretation from a first human-spoken language to a second human-spoken language. Further, the processor routes the plurality of requests to a plurality of MLIs. In addition, an artificial intelligence ("AI") system associated the plurality of MLIs determines one or more QC criteria. The processor also monitors compliance of the one or more QC criteria by the plurality of machine language interpreters during simultaneously occurring machine language interpretations performed by the MLIs.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A QC configuration is provided to monitor, in real-time or substantially real-time (defined as being humanly unperceivable within a period of time ranging from one millisecond to sixty seconds), a plurality of simultaneously occurring OPI sessions performed by an MLI. For instance, a GUI is rendered to display data (e.g., a real-time transcript, snapshot, etc.) associated with the plurality of OPI sessions. Further, the QC configuration may have a scoring engine that scores the data rendered by the GUI; such scoring allows for machine learning improvements to an artificial intelligence ("AI") system associated with the MLI in addition to retention of contextual information useful for subsequent human-spoken language interpretations performed by one of the MLIs for the current users or for other users.

In contrast with human-based OPI systems, the QC configuration is a scalable OPI system that provides faster access to a language interpretation session. In other words, the QC configuration may instantiate an MLI based on user demand without the limitation of human language interpreter availability. Further, the QC configuration may store transcripts of the OPI sessions in a database to perform machine learning for the AI to improve the quality of language interpretation sessions performed by the MLIs.

Figure 1:
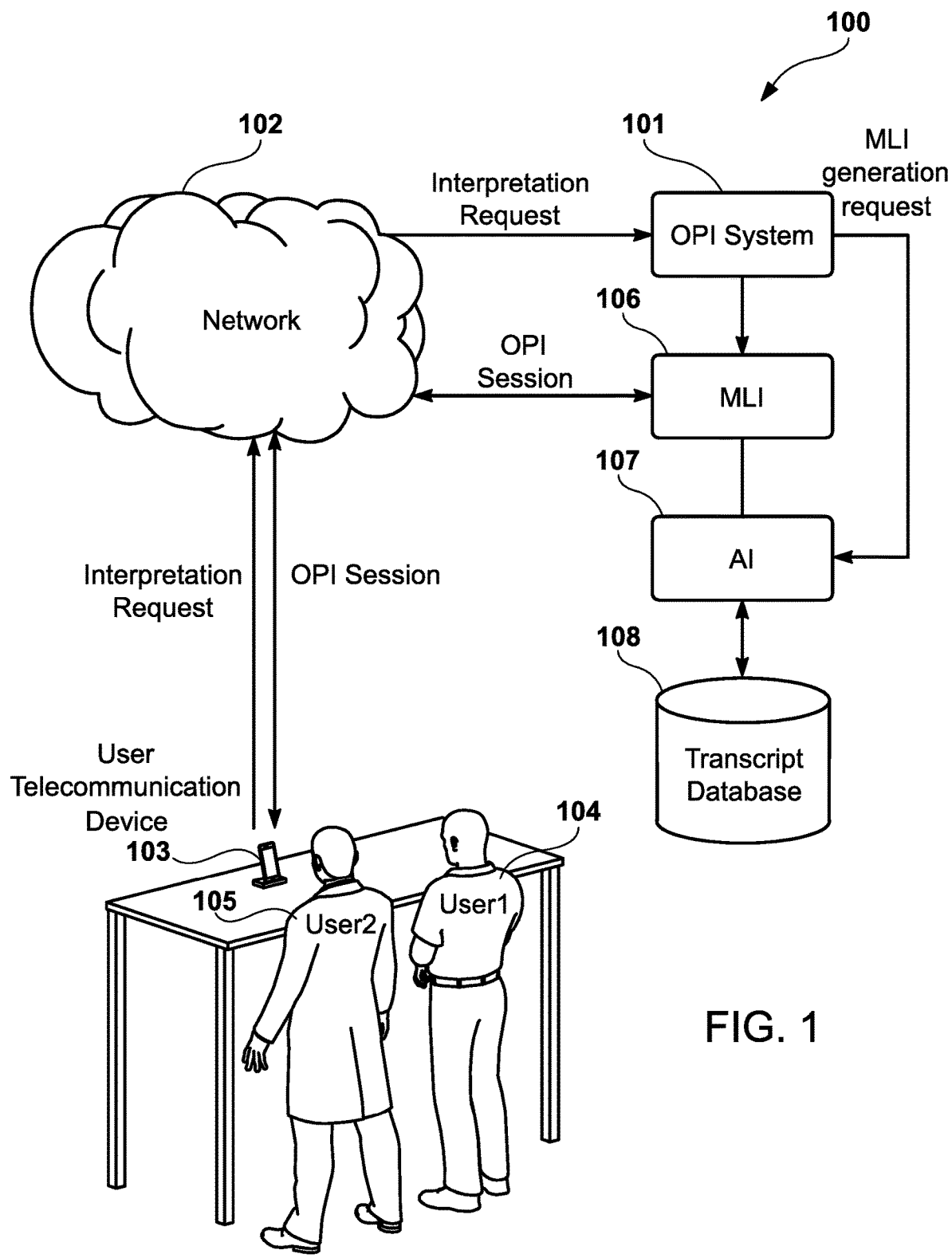
FIG. 1 illustrates an MLI configuration, which is an example of a single MLI being utilized for an OPI session.

FIG. 1 illustrates an MLI configuration 100, which is an example of a single MLI 106 being utilized for an OPI session. For instance, an OPI system 101 may receive a request, through a network (telecommunications, computerized, etc.), from a user telecommunications device 103 (e.g., telephone, smartphone, tablet device, smartwatch, laptop, personal computer, etc.) for human-spoken language interpretation. As an example, a first user 104, who speaks Spanish, and a second user 105, who speaks English, may both be situated at the same user telecommunication device 103 to request language interpretation of their conversation, via the user telecommunication device 103, by the MLI 106 in an OPI session. Alternatively, the users 104 and 105 may each then connect to the OPI session via different user telecommunication devices 103 at different locations.

The OPI system 101 routes the interpretation request to the MLI 106, which is selected by the OPI system 101 from a plurality of available MLIs 106; if an MLI is unavailable, the OPI system 101 may send a request to an AI 107 to generate the MLI 106. Further, the AI 107 may operate the MLI 106 to perform the human-spoken language interpretation for the OPI session.

In one embodiment, the AI 107 is in operable communication with a transcript database 108, which stores transcripts of previous OPI sessions (human interpreter-generated or MLI-generated). The AI 107 may utilize the transcript database 108 to perform machine learning so that the MLI 106 may perform effective machine interpretation.

Figure 2:
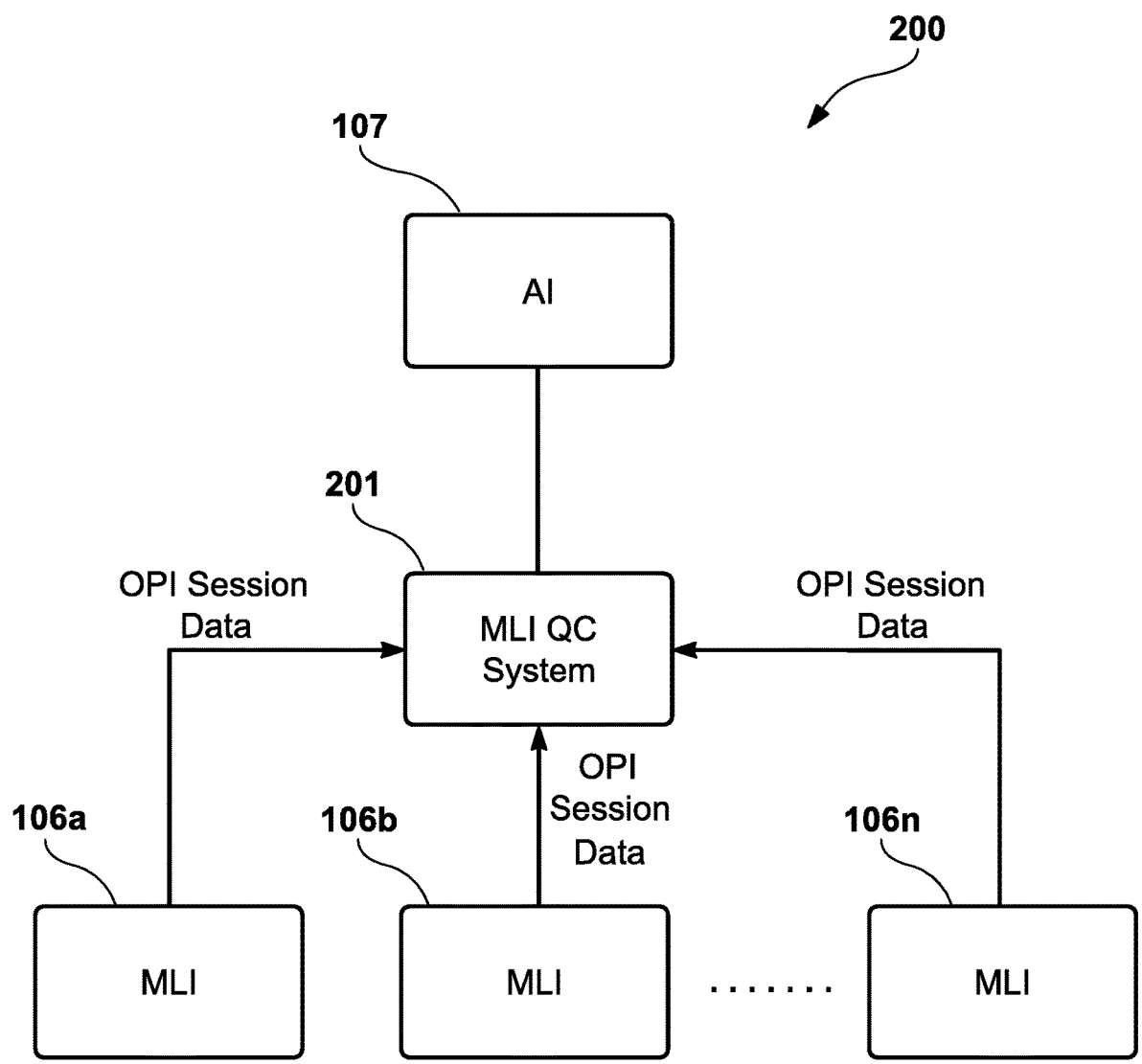
FIG. 2 illustrates an MLI QC configuration that may be utilized to monitor the quality of multiple, simultaneous OPI sessions being interpreted by a plurality of MLIs.

Further, FIG. 2 illustrates an MLI QC configuration 200 that may be utilized to monitor the quality of multiple, simultaneous OPI sessions being interpreted by a plurality of MLIs 106a-106n. For instance, an MLI QC system (e.g., a server) may simultaneously monitor, in real-time or substantially real-time, a plurality of OPI sessions. The MLIs 106a-106n may each provide OPI session data to the MLI QC system 201 so that the MLI QC system 201 may simultaneously monitor the OPI sessions. As an example, the OPI session data may be a real-time, or substantially real-time, generated transcript of an OPI session during the live OPI sessions or during a playback of prerecorded OPI sessions.

The MLI QC system 201 allows for centralized monitoring of, and responsiveness to, interpretations performed by the MLIs 106a-106n. For instance, the MLI QC system 201 may implement a specific set of rules that the MLIs 106a-106n have to follow to ensure QC compliance; in one embodiment, such rules are dynamically determined by the AI 107 through communication between the AI 107 and the MLI QC system 201 during, or after, the OPI sessions. For example, the AI 107 may establish a baseline norm for a behavior performed by multiple MLIs 106 that is well-received by multiple users, as observed by the AI 107. Conversely, the AI 107 may establish that a behavior performed by multiple MLIs 106 is unacceptable as it was not well-received by multiple users. In other words, the simultaneous observation of multiple OPIs allows the AI 107 to utilize machine learning to dynamically generate QC criteria for consistent QC enforcement by the MLI QC system 201.

Accordingly, the MLI QC configuration 200 improves the functioning of a computer by reducing memory requirements. Rather than having a QC component, and associated memory requirements, for each MLI 106, the MLI QC configuration 200 has a centralized system with less memory requirements for that centralized system than for a plurality of MLIs 106.

Upon detection of a QC violation, the MLI QC system 201 may take various actions to remedy the violation or to enforce compliance. For example, the MLI QC system 201 may intervene in, augment, override, or escalate the OPI session; such actions may involve seamlessly switching the OPI session to another MLI 106 without the users 104 and 105 (FIG. 1) even being aware of such a switch. Another example of a remedial action is for the MLI QC system to itself replace a particular portion of the OPI session with a QC-compliant portion (i.e., the MLI 106 may inform the users of a correction). As yet another example of a remedial action, the MLI QC system 201 may request that a human language interpreter intervene and replace the MLI 106 for the remainder, or at least a portion of the remainder, of the OPI session.

In one embodiment, the MLI QC system 201 automatically monitors the simultaneously occurring OPI sessions and automatically determines remedial actions. In another embodiment, the MLI QC system 201 generates a GUI that allows for human monitoring and/or remedial action determination in addition to, or in lieu of, the automatic monitoring and/or remedial action determination performed by the QC system 201.

In one embodiment, the MLI QC system 201 is distinct from the AI 107. In yet another embodiment, the AI 107 and the MLI QC system 201 are integrated into a single system.

Figure 3:
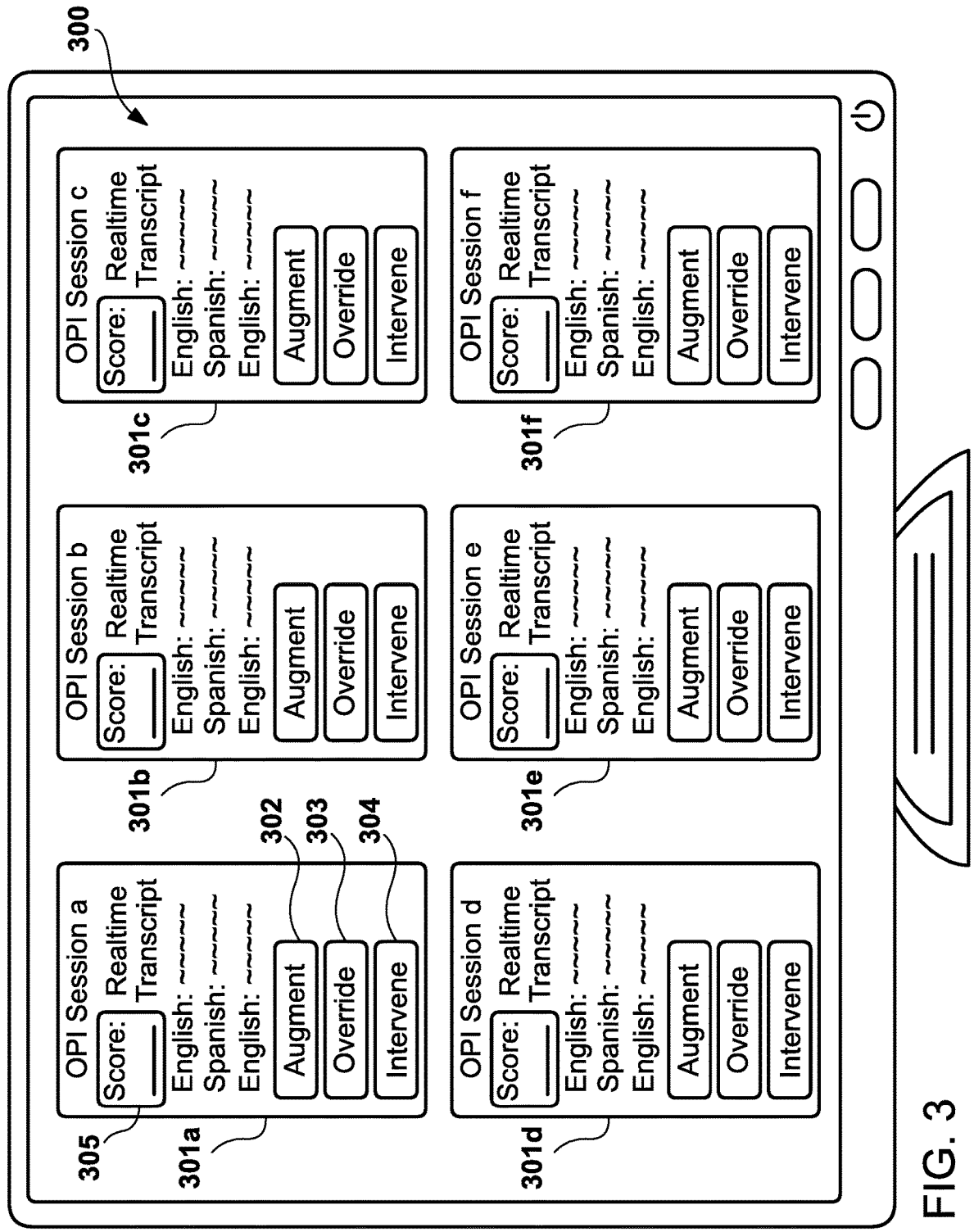
FIG. 3 illustrates an example of a graphical user interface ("GUI") rendered by a display device in operable communication with the MLI QC system illustrated in FIG. 2.

FIG. 3 illustrates an example of a GUI 300 rendered by a display device in operable communication with the MLI QC system 201 illustrated in FIG. 2. As an example, the GUI 300 may illustrate a plurality of windows 301a-301f, each corresponding to a particular live OPI session. Real-time transcripts may be simultaneously displayed for each of the windows 301a-301f so that a human observer (e.g., a human language interpreter) may monitor simultaneously occurring OPI sessions being interpreted by MLIs 106a-106f. Further, the GUI 300 may render a plurality of input indicia (e.g., buttons) to allow the human observer to request that a remedial action be performed. For example, the human observer may select an augment button 302 to augment the OPI session with an additional interpretation; such augmentation may be a directive sent to the MLI 106 to add the additional material so that it appears as if it was generated by the MLI 106 to avoid the appearance of an interpretation by a human observer. As another example, the human observer may select an override button 303 to override an interpretation performed by the MLI 106; such an override may also occur without the appearance of human observer interpretation as the MLI 106 may be directed to inform the users that a correction is being performed. The human observer may also select an intervene button 304 to intervene in the OPI session. In any of the aforementioned instances, the GUI 300 may display a pop-up window, another screen, etc. to allow the human observer to provide augmenting, overriding, and/or intervening input. The aforementioned input indicia are provided only as examples since various other input indicia may be rendered by the GUI 300.

Further, in one embodiment, a score indicium 305 may be depicted within each of the windows 301a-301f. A human observer may view the score indicium 305 to determine which of the windows 301a-301f necessitates the most observation. For example, if the window 301d has a low score, the human observer may concentrate on the window 301d rather than the remaining windows.

Figure 4:
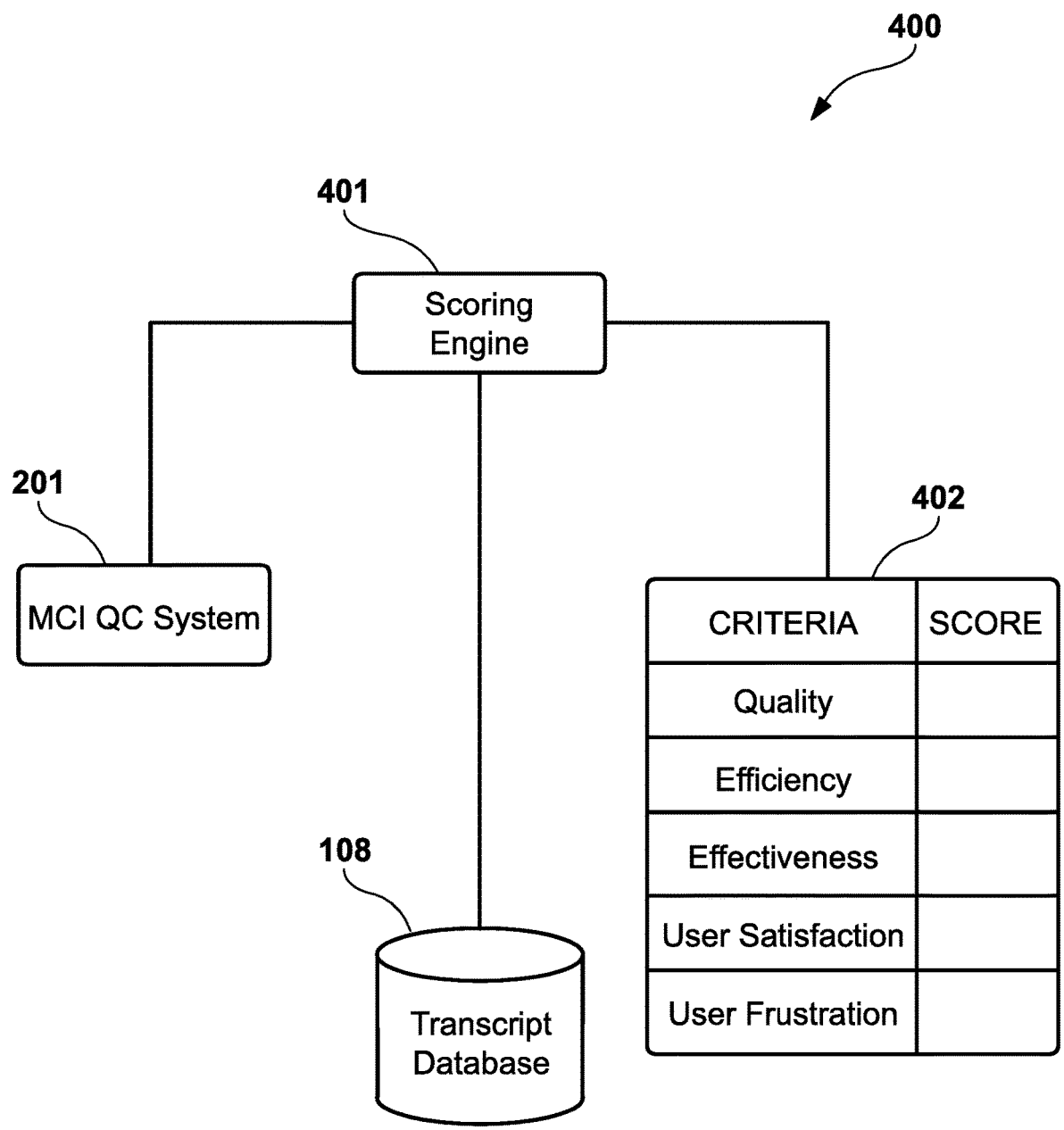
FIG. 4 illustrates a scoring configuration that has a scoring engine that is in operable communication with the MLI QC system and the transcript database.

In addition, the determination of QC compliance may be determined by a human observer, or the MLI QC configuration 201 illustrated in FIG. 2, based on a scoring process. FIG. 4 illustrates a scoring configuration 400 that has a scoring engine 401, which is in operable communication with the MLI QC system 201 and the transcript database 108. The scoring engine 401 generates, or utilizes a pre-established, scoring template 402, which has various criteria (e.g., quality, efficiency, effectiveness, user satisfaction, and user frustration). Various other criteria may be utilized instead.

Further, the scoring engine 401 assigns a score to each of the criteria. In one embodiment, the scoring engine 401 assigns scores, in real-time or substantially real-time, to prerecorded OPI sessions for machine learning, session transcription, and OPI delivery quality. As a result, the MLI QC system 201 illustrated in FIG. 2 may compare current OPI session material with similar material that was previously scored (e.g., from the transcript database 108) to determine QC compliance, or lack of QC compliance, for the current material.

The scoring template 402 may be provided to the MLI QC system 201 to display a score for each score indicium 305 corresponding to each window 301a-301f illustrated in FIG. 2. Alternatively, or in addition, the display device 103, which renders the GUI 301 illustrated in FIG. 3, may also render a pop-up window, additional screen, etc. to display the scoring template 402.

Although the MLI QC configuration 200 has been described with respect to OPI sessions, the MLI QC configuration 200 may be utilized for other communication channels also. For instance, the MLI QC configuration 200 may be utilized for video remote interpretation ("VRI") configurations whereby a video session is established between the MLI 106 (e.g., via an avatar) and the users 104 and 105. In various embodiments, the MLI QC configuration 200 may be utilized in any digital or analog communication network that facilitates language interpretation from a first language to a second language.

Further, the scoring engine 401 may be utilized in contexts other than for scoring as a basis for QC compliance. For instance, the scoring engine 401 may be utilized to securely evaluate MLIs 106 for use in live human interpretation applications. The scoring template 402 may include various criteria such as grammar and tense being correct, gist being correct, frustration from interacting with the MLI 106, comparison to an interpretation that would have been provided by a live human language interpreter, skill set (medical, business, etc.), and/or other metrics for comparing MLIs 106. Accordingly, a comparison table may be generated to evaluate the different scores, based on the aforementioned criteria, of different MLIs 106.

Figure 5:
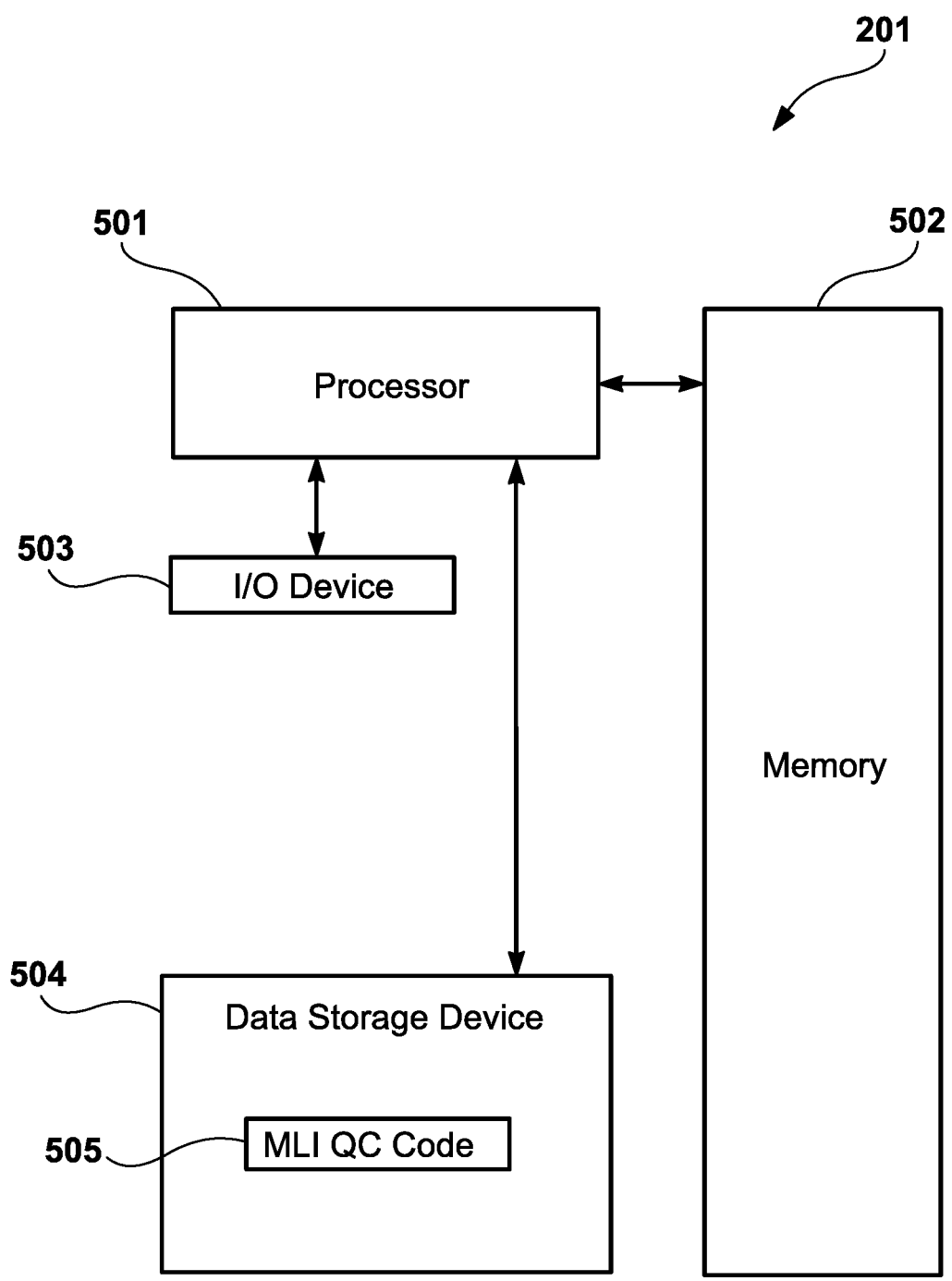
FIG. 5 illustrates the internal components of the MLI QC system illustrated in FIG. 2.

FIG. 5 illustrates the internal components of the MLI QC system 201 illustrated in FIG. 2. The MLI QC system 201 may include a processor 501, a memory 502, an input/output ("I/O") device 503 (e.g., microphone, audio recorder, image capture device, keyboard, touch-screen, joystick, gesture detection device, etc.), and data storage device 504.

The data storage device 504 may include MLI QC code 505. The processor 501 may execute the MLI QC code to generate MLIs 106 (FIG. 2), generate the GUI 300 (FIG. 3), operate the scoring engine 401 (FIG. 4), and perform any other operation for QC compliance of simultaneously occurring OPI sessions being interpreted by multiple MLIs 106.

Figure 6:
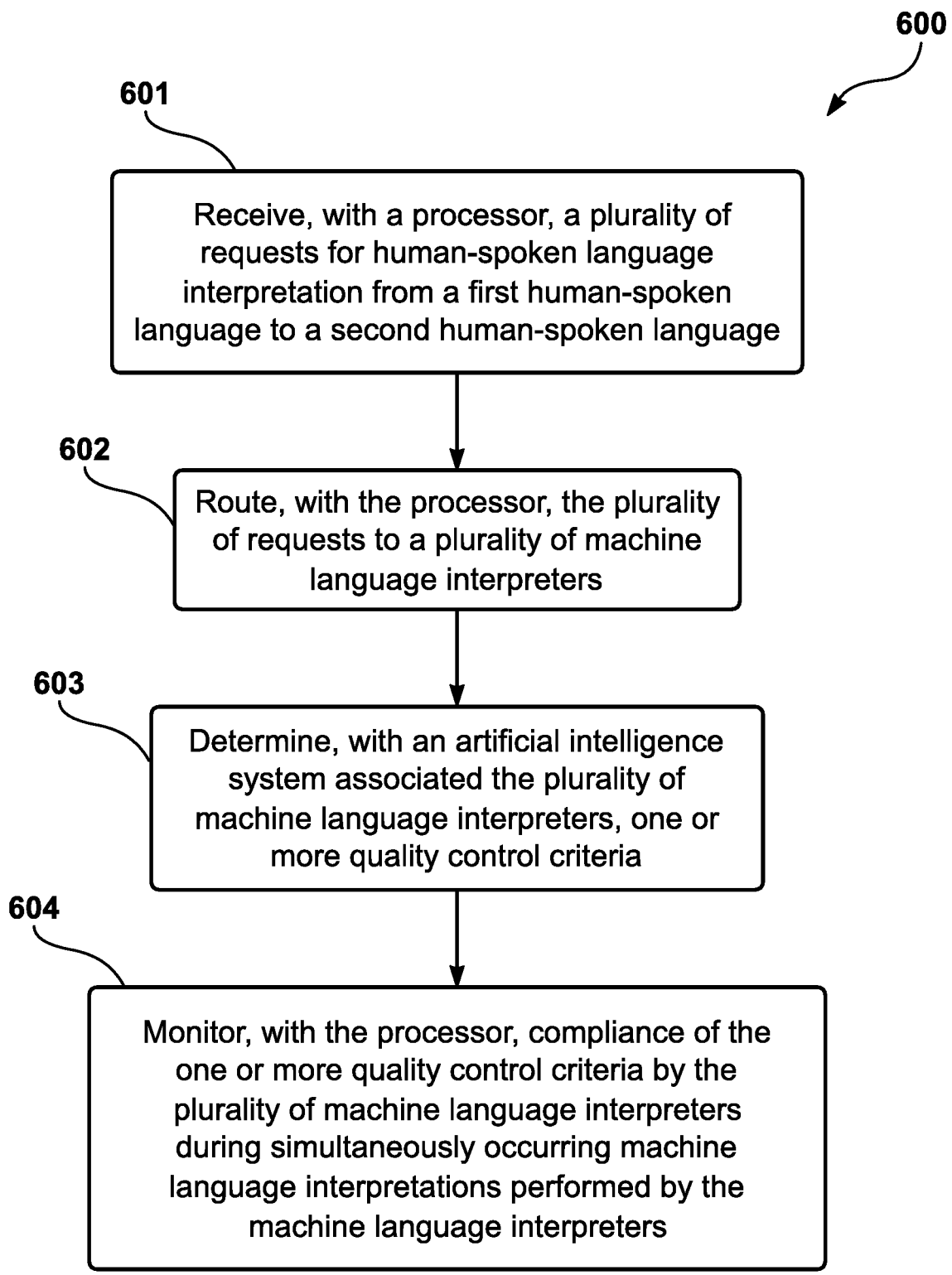
FIG. 6 illustrates a process 600 that may be utilized to provide QC compliance for the plurality of MLIs illustrated in FIG. 2.

FIG. 6 illustrates a process 600 that may be utilized to provide QC compliance for the plurality MLIs 106 illustrated in FIG. 2. At a process block 601, the process 600 receives, with the processor 501 (FIG. 5), a plurality of requests for human-spoken language interpretation from a first human-spoken language to a second human-spoken language. Further, at a process block 602, the process 600 routes, with the processor 501, the plurality of requests to a plurality of MLIs 106 (FIG. 2). In addition, at a process block 603, the process 600 determines, with the AI 107 (FIG. 2) associated the plurality of MLIs 106, one or more QC criteria. The process 600 also monitors, with the processor 501, compliance of the one or more QC criteria by the plurality of MLIs 106 during simultaneously occurring machine language interpretations performed by the MLIs 106.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses.

Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:
   receive, with a processor, a plurality of requests for a plurality of voice-based human-spoken language interpretations from a first human-spoken language to a second human-spoken language from a plurality of voice-based communication devices;
   route, with the processor, the plurality of requests to a plurality of machine language interpreters that simultaneously perform the plurality of voice-based human-spoken language interpretations;
   simultaneously monitor, with the processor, a plurality of reactions of users to the plurality of voice-based human-spoken language interpretations performed by the plurality of machine language interpreters;
   dynamically determine, with an artificial intelligence system during the simultaneous monitoring, one or more quality control criteria based upon the plurality of reactions, the one or more quality control criteria establishing a norm for behavior of the plurality of machine language interpreters;
   monitor, with the processor, compliance of the one or more quality control criteria by the plurality of machine language interpreters during the plurality of voice-based human-spoken language interpretations performed by the plurality of machine language interpreters; and
   render a graphical user interface that displays data associated with each of the plurality of machine language interpretations.

2. The computer program product of claim 1, wherein the data is a transcript of a machine language interpretation session.

3. The computer program product of claim 2, wherein the graphical user interface displays a plurality of input indicia that each correspond to a command that supplements the machine language interpretation.

4. The computer program product of claim 1, wherein the human-spoken language interpretation is voice-based and is provided via a telecommunications network.

5. The computer program product of claim 1, wherein the human-spoken language interpretation is video-based and is provided via a computerized network.

6. The computer program product of claim 1, wherein the computer is further caused to generate a score for the machine language interpretation according to each of the one or more quality control criteria.

7. A method comprising:
   receiving, with a processor, a plurality of requests for a plurality of voice-based human-spoken language interpretations from a first human-spoken language to a second human-spoken language from a plurality of voice-based communication devices;
   routing, with the processor, the plurality of requests to a plurality of machine language interpreters that simultaneously perform the plurality of voice-based human-spoken language interpretations;
   simultaneously monitoring, with the processor, a plurality of reactions of users to the plurality of voice-based human-spoken language interpretations performed by the plurality of machine language interpreters;

dynamically determining, with an artificial intelligence system during the simultaneous monitoring, one or more quality control criteria based upon the plurality of reactions, the one or more quality control criteria establishing a norm for behavior of the plurality of machine language interpreters;

monitoring, with the processor, compliance of the one or more quality control criteria by the plurality of machine language interpreters during the plurality of voice-based human-spoken language interpretations performed by the plurality of machine language interpreters; and rendering a graphical user interface that displays data associated with each of the plurality of machine language interpretations.

8. The method of claim 7, wherein the data is a transcript of a machine language interpretation session.

9. The method of claim 8, wherein the graphical user interface displays a plurality of input indicia that each correspond to a command that supplements the machine language interpretation.

10. The method of claim 7, wherein the human-spoken language interpretation is voice-based and is provided via a telecommunications network.

11. The method of claim 7, wherein the human-spoken language interpretation is video-based and is provided via a computerized network.

12. The method of claim 7, wherein the computer is further caused to generate a score for the machine language interpretation according to each of the one or more quality control criteria.

13. An apparatus comprising:

a processor that receives a plurality of requests for a plurality of voice-based human-spoken language interpretations from a first human-spoken language to a second human-spoken language from a plurality of voice-based communication devices, routes the plurality of requests to a plurality of machine language interpreters that simultaneously perform the plurality of voice-based human-spoken language interpretations, simultaneously monitors a plurality of reactions of users to the plurality of voice-based human-spoken language interpretations performed by the plurality of machine language interpreters, dynamically determines, during the simultaneous monitoring, one or more quality control criteria based upon the plurality of reactions, and monitors compliance of the one or more quality control criteria by the plurality of machine language interpreters during the plurality of voice-based human-spoken language interpretations performed by the plurality of machine language interpreters, and renders a graphical user interface that displays data associated with each of the plurality of machine language interpretations, the one or more quality control criteria establishing a norm for behavior of the plurality of machine language interpreters.

14. The apparatus of claim 13, wherein the data is a transcript of a machine language interpretation session.

15. The apparatus of claim 14, wherein the graphical user interface displays a plurality of input indicia that each correspond to a command that supplements the machine language interpretation.

16. The apparatus of claim 13, wherein the human-spoken language interpretation is voice-based and is provided via a telecommunications network.

17. The apparatus of claim 13, wherein the human-spoken language interpretation is video-based and is provided via a computerized network.

* * * * *